Patented Feb. 20, 1934

1,948,454

UNITED STATES PATENT OFFICE 1,948,454

FERTILIZER MANUFACTURE

Charles L. Burdick, Wilmington, Del., assignor to E. I. du Pont de Nemours & Company, Wilmington, Del., a corporation of Delaware No Drawing. Application June 18, 1931
Serial No. 545,373

3 Claims. (Cl. 71—7)

This invention relates to fertilizers and more particularly to phosphatic fertilizers containing nitrogen and methods for manufacture thereof.

It is known to manufacture fertilizers from mineral phosphate by treating the material with acid to convert the normal phosphate content thereof to more soluble acid phosphate salts, the product being generally known as superphosphate. Thus, for example, it is known to produce ordinary superphosphate, the acid phosphate of commerce, by treating phosphate with sulfuric acid; to obtain a second variety, double superphosphate, by treating phosphate rock with a mixture of sulfuric and phosphoric acid; and to manufacture a third variety, triple superphosphate, by the action of phosphoric acid alone upon phosphate rock.

It is also known to incorporate nitrogen with such phosphatic materials and various methods and processes have been proposed therefor. Among various proposals heretofore made for ammoniation the use of commercial anhydrous ammonia appears to have been most widely adopted. It has been found difficult, however, to incorporate nitrogen with superphosphate in this manner to a degree substantially greater than 4%. Thus, it has been ascertained that, although ammonia can be incorporated to the extent of about 4.8% into a superphosphate, however, as soon as approximately this percentage of ammoniation has been reached, the temperature produced during the ammoniation becomes so great as to cause substantially complete retardation of ammonia absorption.

For the purpose of overcoming the unwanted cessation of ammonia absorption, it has been proposed to first ammoniate phosphatic materials to the extent of approximately 4% nitrogen with anhydrous ammonia, to cool the ammoniated product and subsequently to employ further amounts of anhydrous ammonia for the purpose of obtaining a larger percentage of ammonia in the phosphatic material which has previously been partially ammoniated. However, this proposed method is not practically feasible inasmuch as the product resulting from such ammoniation in steps, as above described, tends to be unstable, being subject over a period of time to a probable reversion of its soluble $P_2O_5$ content to that of an insoluble character.

It is an object of the present invention to produce a concentrated fertilizer of the ammoniated phosphate type of a higher ammonia content than has hitherto been commercially feasible.

It is a further object of the invention to provide a new and improved process for producing a stable fertilizer of the character described.

Other objects and advantages of the invention will be apparent as it is better understood by reference to the following specification in which its details and preferred embodiments are described.

I have discovered that an improved ammoniated superphosphate, stable in character, of a form well adapted to requirements of the trade, and containing upwards to 5½% nitrogen, can be obtained by first treating a commercial superphosphate with anhydrous ammonia and thereafter treating the said phosphatic materials with aqua ammonia.

Generally speaking, the ammonia may be employed in the form of a pure gas a diluted gas, or as liquid anhydrous ammonia in the first step of ammoniation, although from the standpoint of material cost the use of liquid anhydrous ammonia may be desirable.

I have discovered, more specifically, that whereas an unstable product is obtained by the step-wise ammoniation of superphosphate as hereinbefore described, it is possible to accomplish ammoniation of phosphatic materials above 4% nitrogen and to obtain a highly ammoniated, stable product by adding aqua ammonia to a superphosphate which has previously been ammoniated upwards to substantially 4% nitrogen.

I have also found that it is necessary to accomplish the preliminary ammoniation upwards to 4% nitrogen (4.8% ammonia) by means of anhydrous ammonia in as much as when aqua ammonia is used in this preliminary ammoniation the final treated product is of such a moist character as to be unsuitable for the fertilizer trade. I have further found that, although the temperature produced by the reaction when ammoniating the superphosphate to the extent of 4% nitrogen is of such a degree as to substantially completely retard further absorption of the anhydrous ammonia, I can accomplish ammoniation upwards to 5½% nitrogen by the addition at that point, i. e. after ammoniation to 4% nitrogen employing anhydrous ammonia, by the addition thereto of aqua ammonia.

Thus, for example, when ordinary superphosphate, the reaction product of sulfuric acid and phosphate rock, is ammoniated by adding thereto liquid anhydrous ammonia in the ratio of about 48 pounds of anhydrous ammonia to 1000 pounds of superphosphate and the mixture agitated until thoroughly intermingled, a product is obtained containing approximately 4% nitrogen. To the ammoniated phosphatic material thus obtained 50 parts of aqua ammonia (25% strength) are added and thoroughly mixed therewith to obtain a final product containing substantially 5% total nitrogen. This product is highly stable in character and adapted to the fertilizer requirements for storage, handling, and distribution.

It will be understood that, if desired, other substances may be incorporated in the fertilizer as, for example, other fertilizing salts or inert materials such as sand and other fillers, these being introduced, as may be most convenient, either before, during, or after the treatment with anhydrous or aqua ammonia.

Various changes may be made in the methods described and in the manner of operating and carrying out the invention without departing therefrom or sacrificing any of the advantages thereof.

I claim:

1. The process of producing a fertilizer which comprises treating a superphosphate with anhydrous ammonia to the extent of substantially 4% nitrogen incorporation and thereafter treating the same with aqua ammonia.

2. The process of producing a fertilizer which comprises treating a superphosphate with anhydrous ammonia upwards to substantially 4% nitrogen incorporation and then ammoniating the same with aqua ammonia upwards to substantially 5½% nitrogen.

3. The process of producing a fertilizer which comprises treating 1000 parts of superphosphate with 48 parts of liquid anhydrous ammonia and then treating the resultant product with 50 parts of aqua ammonia (25% strength).

CHARLES L. BURDICK.